(12) United States Patent
Ren et al.

(10) Patent No.: US 8,273,249 B2
(45) Date of Patent: Sep. 25, 2012

(54) METHOD INTEGRATING ELECTROCHEMICAL OXIDATION AND FLOCCULATION PROCESSES FOR PRE-TREATMENT OF COKING WASTEWATER

(75) Inventors: Hongqiang Ren, Nanjing (CN); Yunjun Yang, Nanjing (CN); Lili Ding, Nanjing (CN); Xiaolei Shi, Nanjing (CN)

(73) Assignee: Nanjing University (CN)

( * ) Notice: Subject to any disclaimer, the term of this patent is extended or adjusted under 35 U.S.C. 154(b) by 410 days.

(21) Appl. No.: 12/672,112

(22) PCT Filed: Jul. 25, 2008

(86) PCT No.: PCT/CN2008/001374
§ 371 (c)(1),
(2), (4) Date: Feb. 4, 2010

(87) PCT Pub. No.: WO2009/021396
PCT Pub. Date: Feb. 19, 2009

(65) Prior Publication Data
US 2011/0220585 A1  Sep. 15, 2011

(30) Foreign Application Priority Data
Aug. 10, 2007 (CN) .......................... 2007 1 0025657

(51) Int. Cl.
| | |
|---|---|
| B01D 21/00 | (2006.01) |
| B01D 21/01 | (2006.01) |
| C02F 1/52 | (2006.01) |
| C02F 1/72 | (2006.01) |
| C02F 1/461 | (2006.01) |
| C02F 1/00 | (2006.01) |
| C02F 1/34 | (2006.01) |
| C02F 1/48 | (2006.01) |
| C02F 1/76 | (2006.01) |
| B03D 3/00 | (2006.01) |

(52) U.S. Cl. ... 210/721; 210/724; 210/758; 210/748.01; 210/748.16; 205/742; 205/744; 205/755; 205/757; 205/760

(58) Field of Classification Search .................. 210/721, 210/724, 725, 758, 748.01, 748.16, 748.17, 210/748.18; 205/742, 744, 755–757, 760
See application file for complete search history.

(56) References Cited

U.S. PATENT DOCUMENTS 6,328,898 B1  12/2001  Akiyama et al.
(Continued)

FOREIGN PATENT DOCUMENTS

CN  1367140  9/2002
(Continued)

OTHER PUBLICATIONS

Qian et al., "Preliminary study on the electrolytic decoloration technology and its mechanism for coking-plant wastewater", Aug. 2005, Techniques and Equipment for Environmental Pollution Control 18-22 vol. 6, No. 8, 9 pages.

(Continued)

Primary Examiner — Christopher Upton
Assistant Examiner — Nader Hossaini
(74) Attorney, Agent, or Firm — Schmeiser, Olsen & Watts, LLP

(57) ABSTRACT

A new method that integrates electrochemical oxidation and flocculation processes for removing ammonia nitrogen in coking wastewater is disclosed in this invention. It comprises steps as follow: first, adjusting the PH of coking wastewater and adding $Fe^{2+}$ into the wastewater; then leading the wastewater containing $Fe^{2+}$ through such 5 areas as pulsed high-voltage discharge oxidation area, pulsed high-frequency DC electrolytic oxidation area, microbubble oxidation area, flocculation area and precipitation area in succession. High-voltage pulse and high-frequency pulse are two different mechanisms for achieving strong oxidation. With help of both solid and liquid catalysts, these two oxidations can work synergistically. The recalcitrant organic chemicals are effectively destroyed and satisfactorily removed out of wastewater. The high-concentration coking waster pretreated with this method will meet Chinese highest discharge standard as long as the routine biochemical treatment is applied thereafter. The total investment on equipments and operation expenditure of the whole system is economically modest, which, together with its highly efficient treatment performance, ensures its extensive application in the field of wastewater treatment.

5 Claims, 1 Drawing Sheet

U.S. PATENT DOCUMENTS 6,572,759 B1 * 6/2003 Nishimura et al. .......... 205/687
2003/0136740 A1 7/2003 Watanabe et al.

FOREIGN PATENT DOCUMENTS

| CN | 1663916 | 9/2005 |
|---|---|---|
| JP | 10323682 | 12/1998 |
| JP | 2003062579 | 3/2003 |
| WO | 2009021396 | 2/2009 |

OTHER PUBLICATIONS

Zhenghao et al, "Study on the Pulsed Corona Discharge in the Treatment of Wastewater in Coking Plant", Apr. 2003, High Voltage Engineering, vol. 29 No. 4: 29-31, 6 pages.

Ke et al, "Treatment of coking wastewater with electro-coagulation", Sum 116 No. 5 Chemical Engineer May 2005, 7 pages.

* cited by examiner

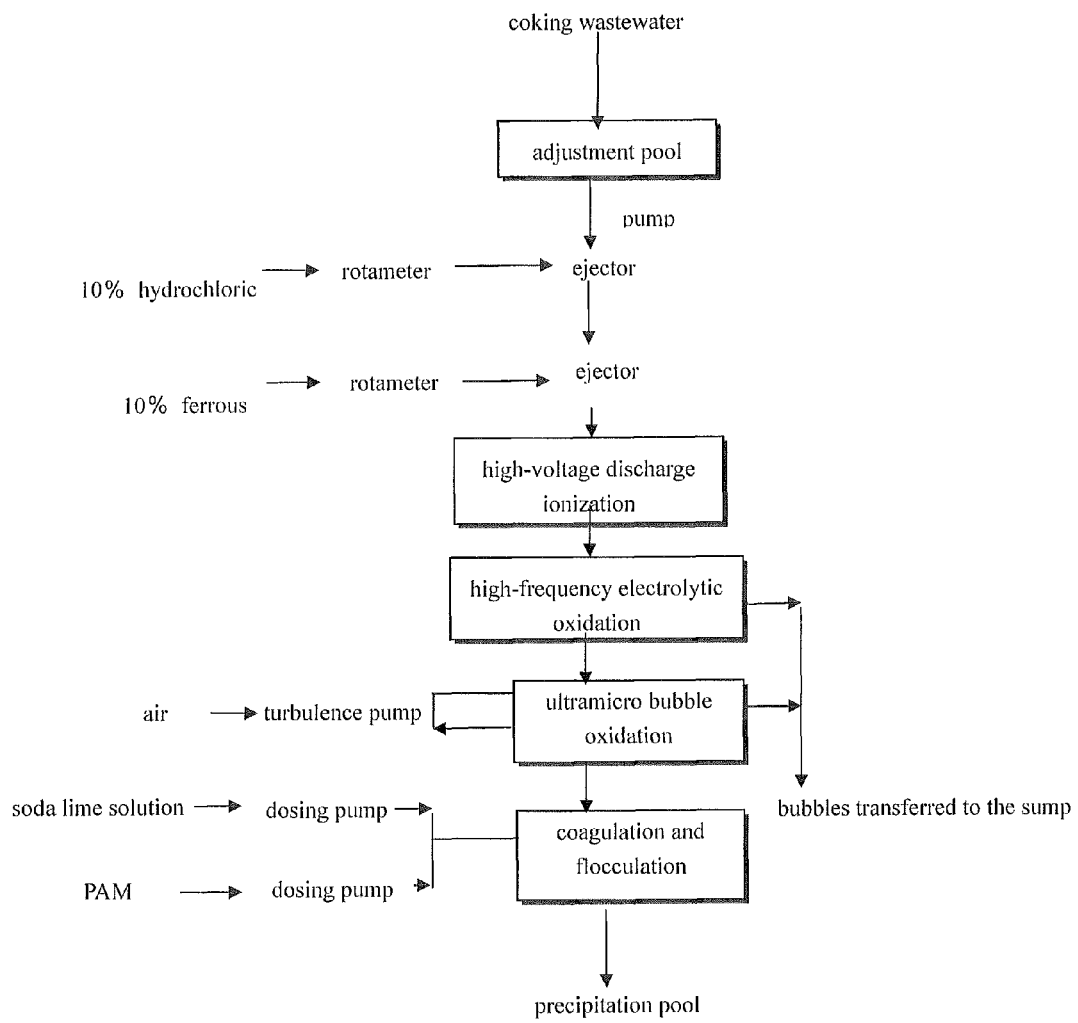

METHOD INTEGRATING ELECTROCHEMICAL OXIDATION AND FLOCCULATION PROCESSES FOR PRE-TREATMENT OF COKING WASTEWATER

FIELD OF INVENTION

This invention relates to coking wastewater treatment, specifically, a technique that integrates electrochemical oxidation and flocculation to pretreat the high-concentration coking wastewater discharged by either coking process of iron and steel plants or coal-gas generation process of coal-gas plants.

BACKGROUND INFORMATION AND RELATED ART

The coking plant is an essential part of iron and steel industry. However, its production activities, such as coal coking, coal-gas purification and recovery of coking byproducts, engender a large quantity of wastewater, namely, coking wastewater. Coking wastewater contains very complex components, particularly phenols, and its exact composition varies in accordance with raw coal's nature, carbonization temperature and procedures and methods adopted in recovering coking byproducts. Apart from phenols and phenolic derivatives, other major organic components in wastewater are aliphatic compounds, heterocyclic compounds and multicyclic aromatic compounds. It also contains various inorganic compounds such as ammonia salts, thiocyanides, sulfides, and cyanides. Hitherto, there has been no satisfactory way in China to purify coking wastewater and make it meet national legal discharge standards. The major reason is that the existing techniques present undesirable effect in treating coking wastewater due to the complex and characteristic pollutants contained in it. Currently, the most widely-adopted method in treating coking wastewater is active sludge process, which does present certain effect. However, since phenolic, cyanide compounds and ammonia nitrogen contained in coking wastewater show great resistance against decomposition effect of this process and the aerobic microorganisms in the sludge may suffer shock or even death when the concentration of these toxic components turns too high. Therefore, this method presents unstable treatment effect and the quality of wastewater so treated is still lower than the highest standard set for safe discharge.

Currently, there are many techniques and methods for treating coking wastewater produced by iron and steel plants. As far as lowering down COD and $NH_3$ is concerned, there are two often used processes: anaerobic-anoxic-oxic ($A_1$-$A_2$-O) process and anoxic-oxic (A-0) process. Due to complex components in the wastewater, particularly high concentration of toxic and recalcitrant organic chemicals therein, coking wastewater treated with either of these two processes hardly meets discharge standards in terms of COD, phenols, cyanides and chromaticity, even though $BOD_5$ may satisfy the requirements. Some other newly-developed advanced treatment (tertiary treatment) techniques may be able to obtain safe discharge, but they meanwhile present many defects, such as long hydraulic retention time, consumption of active carbon grains and coagulants, or renewal of carbon source, which consequently increases operation expenditure and even endangers stability of the quality of discharged water.

In consideration of a large amount of organic chemicals, particularly those recalcitrant against bio-decomposition, in coking wastewater and high cost for implementing tertiary treatment system, it is necessary to find a new, highly efficient pre-treatment method in order to take the place of the existing tertiary treatment techniques. In this pre-treatment stage, most of organic chemicals should be decomposed and toxic pollutants should be dramatically reduced, which in turn ensures high effectiveness of later routine biochemical treatment (secondary treatment) and eventually obtains stable and safe discharge.

There are many techniques designated for pre-treatment of coking wastewater, among which many advanced oxidation methods are adopted, including supercritical water oxidation, electrochemical oxidation, Fenton oxidation, photocatalytic oxidation/microelectrolysis, ultrasonic treatment and pulsed high-voltage discharge treatment. Most of techniques are still in their laboratory stage and show distinctive effect on removing one or two pollution indices. However, they fail to obtain comprehensive removal of most pollution indices despite their high operation expenditure. Therefore, it takes a long time before they can be applied for practical utilization.

Wu Keming from Wuhan University of Science and Technology (*Chemical Engineers Journal*. 116.5) discloses an electrolytic flocculation technique for treating coking wastewater. Both cathode and anode of the electrolyzer are made of aluminum plates and DC electricity generated by a transistor current to stabilizer is used as electrolytic power supply. This method shows excellent effect in solving turbidity of coking wastewater but poor performance in reducing such pollution indices as chromaticity and COD.

Ma Qian, et, al. from College of Life Science and Technology of Tongji University (*Techniques and Equipment for Environmental Pollution Control*. 6.8 (2005)) discloses another electrolytic flocculation technique in which aluminum plates are used as the cathode and anode of the electrolyzer, and pure DC electricity supply is used in treating coking water that has experienced biochemical treatment yet still fails to meet safe discharge standard (COD=300-500 mg/L). The outcome of experiment shows that the discoloration rate of coking water reaches 93.6%. Though COD removal rate is up to 61.78%, its concentration in treated wastewater is still higher than required standard, which means further advanced treatment has to be applied before the wastewater meets the highest discharge standard stipulated by Chinese government.

He Zhenghao, et, al. from Huazhong University of Science and Technology (*High Voltage Engineering*. 29.4) discloses a new technique for pre-treatment of coking wastewater in which the technology of nanosecond pulsed corona discharge is adopted to pretreat high-concentration coking wastewater in spraying form. This technique can remove more than 90% of cyanides and 70% of phenols. However, its performance in removing ammonia nitrogen and COD is disappointing. In addition, analysis of its outcome shows that this technique is able to improve the biodegradability of coking wastewater.

In summary, the composition of coking wastewater is very complex. It contains not only such decomposable chemicals as phenols and phenolic derivatives, but other recalcitrant chemicals like multicyclic compounds and heterocyclic aromatic compounds as well. Though it is a cost-effective way utilizing anaerobic and oxic microorganisms in coking wastewater treatment, the wastewater treated in this way hardly satisfies increasingly high environmental requirements as far as such pollution indices as $COD_{Cr}$, chromaticity, and $NH_3$—N are concerned.

Though there are many techniques, both in China and other countries, concerning pretreatment of coking wastewater, most techniques used in current China embody many defects like high cost in such pretreatment processes as distilling ammonia and extraction as well as inefficient reuse of recovered phenols, which may otherwise offset part of treatment cost. As to simple, routine electrolytic oxidation, it may be effective in removing one or two pollution indices; but its poor comprehensive performance makes it hard to be adopted in large scale application. The pre-treatment system of coking wastewater for practical application calls for high efficiency and significant effect in removing all pollutants; it should also enjoy such favorable features as high working stability, reasonable investment and low operation expenditure.

DETAILED DESCRIPTION OF THE INVENTION

1. Aim of the Invention

In consideration of defects embodied in existing techniques, this invention discloses a new method that integrates electrochemical oxidation and flocculation processes for pretreatment of coking wastewater. This method can significantly reduce major pollutants in coking wastewater and improve its biodegradability. When applied in combination with routine biochemical treatment (A-O process), it ensures the quality of treated wastewater meeting the highest discharge standard stipulated by Chinese government.

2. Mechanisms and Technical Details of the Invention

The general mechanism of this invention is: in consideration of high-concentration and high-chromaticity of coking wastewater, an integral method on the basis of electrolytic oxidation is adopted for its pretreatment. This method consists of such five steps as pulsed high-voltage discharge oxidation, pulsed high-frequency DC electrolytic oxidation, microbubble oxidation, flocculation, and precipitation. After the PH of coking wastewater being adjusted, $Fe^{2+}$ is added into the wastewater. The wastewater containing $Fe^{2+}$ undergoes abovementioned five steps in succession in five respective areas as pulsed high-voltage discharge oxidation area, pulsed high-frequency direct-current electrolytic oxidation area, microbubble oxidation area, flocculation area and precipitation area. High-voltage pulse and high-frequency pulse are two different mechanisms for achieving strong oxidation. With help of both solid and liquid catalysts, these two oxidations can work synergistically. The recalcitrant organic chemicals are effectively destroyed and satisfactorily removed out of wastewater. The coking wastewater treated with this method will meet the highest discharge standard stipulated by Chinese government after a routine biochemical treatment is applied thereafter. The total investment on equipments and operation expenditure of the whole system is economically modest, which, together with its remarkable treatment performance, ensures its extensive application in the field of wastewater treatment.

The ultramicro bubbles created by air and water exert apparent effect on removing dissolvable organic chemicals in coking wastewater, while the flocculant formed by combination of the catalyst $Fe^{2+}$ and $OH^-$ in the wastewater can effectively absorb organic chemicals bearing surface charge, which lowers down the concentration of organic chemicals as well as that of $Fe^{2+}$. The high-voltage pulse and the high-frequency pulse function in two different yet complementary ways in destroying the molecular structure of organic chemicals as well as in changing their surface charge properties, which in turn enhances efficiency of flocculation and precipitation. The processes of adding $Fe^{2+}$ into the wastewater, flocculating, and precipitating provide desirable catalytic conditions for the whole electrochemical treatment. They can offset some unfavorable effects that the whole electrochemical treatment may bring about to later routine biochemical treatment. This therefore satisfactorily obtains the smooth rendezvous of the electrochemical pretreatment and the later biochemical treatment. The high-voltage pulse and to the high-frequency pulse greatly reduce organic chemicals in the wastewater and pave the way for ultromicro bubble oxidation, which in turn enhances the effect of electrolyzing macromolecular organic chemicals. The abovementioned four mechanisms work complementarily and present excellent synergic effect. They can dramatically reduce the key pollution indices such as COD, ammonia nitrogen, cyanides, chromaticity under the comparatively modest operation expenditure. Wastewater treated in this way satisfies the requirements for the later routine biochemical process.

The electrolytic oxidation includes the following three working mechanisms:

a. Mechanism of Pulsed High-Voltage Discharge in Treating Coking Wastewater

This treating process is on the basis of the chemical reaction process of plasma. Ions, electrons, activated atoms, molecules and free radicals spatially concentrated in plasma provide various high-active reactive species. The nanosecond pulsed corona discharge adopted herein creates non-equilibrium plasma, the energy of which, thanks to its narrow pulse breadth and short rise time of the leading edge, will be scarcely consumed by acceleration of ion mobility. Rather, it functions on ions themselves and enriches them with enough energy to be high-active free radicals, which in turn helps splitting or ionization of cyanides and phenols in coking wastewater. Meanwhile, ultraviolet rays and ozone released during the pulsed corona discharge are able to decompose harmful chemicals as well.

b. Mechanism of High-Frequency Pulse Power in Treating Coking Wastewater

Pulsed electrolysis is conducted when an electrolytic pool is connected with the pulse power. The time from switch-on to switch-off of the power is called pulse duration, or pulse breadth ($T_{on}$). It is also the duration when electrolysis is underway. The time from switch-off to switch-on of the power is called electrolytic interval, or pulse interval ($T_{off}$).

A pulse has three independent parameters: pulse voltage (current), pulse breadth ($T_{on}$), and pulse interval ($T_{off}$). In order to achieve better effect in removing pollutants and saving energy, these parameters can be adjusted to a desirable configuration. In contrast with DC power supply, pulsed power supply provides higher current intensity, which consequently enhances effect of electrolysis. Generally, the voltage of pulsed power supply keeps around 100-400 v, much higher than that of DC power supply. Actually, higher voltage can greatly reduce total current intensity and electrolysis time. This therefore improves current efficiency, cuts down on consumption of electricity and ferrous sulfate, and obtains better electrolysis effect. Thanks to reduction of total consumption of electricity and comparatively mild of current, the transformer does not overheat and all equipments work in stable condition.

c. Mechanism of Ultramicro Bubble Oxidation in Treating Coking Wastewater

Ultramicro bubbles (aka. cavitation bubbles) enjoy different physicochemical properties from normal ones. For example, it has higher inner pressure, surface energy and interfacial activity. The existence of ultramicro bubbles in water can bring about local high-temperature and high-pressure, as well as high-concentration of .OH and other reactive oxygen species, all of which have strong oxidability. These changes created by ultramicro bubbles lead to formation of transient supercritical water on the liquid side of bubbles' interface (Water's physicochemical properties, such as viscosity, conductivity, ionic activity, solubility, density and thermal capacity experience sudden change at its supercritical phase. These changes include lower permittivity, higher diffusibility, higher transmission capacity and ideal solvation performance). Pollutants contained in wastewater will be effectively decomposed or completely mineralized through ① decomposition by high temperature (pyrolysis) ② oxidation by free radicals, and ③ oxidation by supercritical water. The modes of decomposition are determined by the physicochemical properties of specific pollutants, and the reaction of to decomposition mainly occurs inside ultramicro bubbles and on their outer surface. Compared with normal bubbles, ultramicro bubbles have enlarged surface area, enhanced inside energy, and enriched surface oxidation capacity as well as larger area on the vapor-liquid surface occupied by the oxygen molecule. This therefore increases utilization rate of the oxygen molecule, and presents higher efficiency than other methods in reoxygenating the water. In addition, since ultramicro bubbles can break up the barrier between vapor-liquid interface, it can also quicken natural reoxygenation of the water. The high surface energy and electrons carried by ultramicro bubbles can orientationally polarize the dipolar hydrone, change its electron cloud and twist or even locally break its hydrogen bond. With these, the large associated hydrone clusters are broken up into smaller one, which consequently activates the water.

d. Mechanism of Flocculation Process

The $Fe^{2+}$ and $Fe^{3+}$ in the wastewater can combine the alkali that is added into the wastewater to form tiny ferrous hydroxide and ferric hydroxide flocculate. Bridged by polyacrylamide, the tiny flocculate can combine together to form bigger ones, which then absorb organic chemicals in the wastewater and become the precipitate. The electrolytic oxidation has changed the surface properties of organic chemicals and made their surface bear positive charge, which consequently facilitates absorption of the flocculate due to its bearing negative charge.

The technical details of this invention include:

A method integrating electrochemical oxidation and flocculation processes for pre-treatment of coking wastewater, comprises steps as follow:

a. pumping high-concentration coking wastewater into the electrolytic oxidation and flocculation reactor; adding acidic solution (normally hydrochloric acid) into the wastewater to adjust its PH to 6-8, then adding ferrous sulfate as a liquid-phase catalyst and treating the wastewater with integrated electrochemical processes as follow;

b. first, leading high-concentration coking wastewater through parallel plate electrodes wherein the wastewater is treated by pulsed high-voltage electric field with following working parameters: leading-edge rise time 40-50 ns, pulse breadth 50-300 ns, electric field strength 20-50 kv/cm, repetition frequency 40-240 pps, and acting time 1-180 s.

c. then, leading the wastewater through another set of parallel plate electrodes wherein it is treated by pulsed high-frequency DC electrolysis with following working parameters: pulse frequency 0.8 MHz-20 MHz, current density at electrolytic oxidation area 200-1000 A/m2, cathode-anode phase change time 1-120 minutes, and electrolytic area retention time 0.5-1 hour; in addition, since the electrodes used therein are DSA ones (outside their ceramics base, coated with a layer of lead dioxide, which acts as catalyst), the current efficiency reaches up to 80%.

d. thirdly, further treating wastewater with microbubble oxidation process wherein an ultramicro aeration apparatus and air-dissolving system are adopted to generate microbubbles smaller than 30 μm in diameter, which serve as an advanced treatment of the organic chemicals in wastewater; the major working parameter of the turbulence pump used therein is air pressure 0.3-0.6 MPa, amounting to 0.1-0.4:1 air-water volume ratio (normal temperature); the retention time of the wastewater in microbubble oxidation process area is 0.5-1.0 hour.

e. fourthly, after being treated at ultramicro aeration oxidation area, the wastewater flows down to the coagulation area, which consists of both coagulation and flocculation areas. In coagulation area, the wastewater is mixed with alkaline solution (soda lime or sodium hydroxide solution) that is proportionally added into it to keep its HP at 8-9; after the coagulation process, the wastewater is led to flocculation area wherein the flocculation takes place due to polyacrylamide added in the wastewater. The whole retention time of the wastewater at this area is 5-20 minutes;

f. lastly, the flocculated mixture flows down to the precipitation pool, wherein it is left for precipitation for 4-6 hours.

The catalyst ferrous sulfate used in Step a. is made up 10% solution before it being added into the wastewater; the required amount of ferrous sulfate (calculated in its solid form) is 0.05-0.2% of the total weight of coking wastewater. The electrodes used in Step c. are DSA ones (outside their ceramics base, coated with a layer of lead dioxide, which acts as catalyst) and their current efficiency reach up to 80%. The polyacrylamide used in Step e. is made up 0.2% solution (weight percentage) before it being added into the wastewater; the required amount of polyacrylamide (calculated in its solid form) is 0.005-0.02% of the total weight of coking wastewater; it helps to form masses of flocculated sludge.

The supernatant separated from the precipitation pool is the wastewater that completes the whole pre-treatment process. The analysis indicates that the removal efficiency of various pollution indices is: $COD \geqq 50\%$, volatile phenols $\geqq 90\%$, cyanides $\geqq 90\%$, ammonia nitrogen $\geqq 70\%$, chromaticity $\geqq 90\%$, and $BOD_5/COD$ (i.e. 5-day biochemical oxygen demand/chemical oxygen demand) $>40\%$. The water quality after the pretreatment stays stable, which is beneficial for later routine biochemical treatment. Applied in combination with routine biochemical technology, the technique disclosed in this invention works very well in treating high-concentration coking wastewater. It is able to lower all pollution indices in coking wastewater down to Chinese highest discharge standard.

3. Beneficial Effects

This invention relates to a method that integrates electrochemical oxidation and flocculation processes for pretreating coking wastewater. The high-concentration coking waster pretreated with this method will meet Chinese highest discharge standard as long as the routine biochemical to treatment is applied thereafter. The total investment on equipments and operation expenditure of the whole system is economically modest, which, together with its highly efficient treatment performance due to multiple working mechanisms, ensures its extensive application in the field of wastewater treatment. Since invention successfully solves the great technical challenge imposed by the coking wastewater produced in the coking process, an essential part of both iron and steel industry and coal industry, it plays a significant role in obtaining a sustainable development of Chinese basic industries, particularly energy industry. It also provides a highly effective, financially acceptable option for treating the wastewater produced by the chemical industry and fine processing products of chemistry-related industries such as medicine, agricultural chemicals. After the treatment, the pollution indices in the wastewater drop dramatically and the biodegradability is significantly improved; both pave the way for the stable operation of the later routine biochemical process.

ILLUSTRATION OF THE FIGURE

FIG. 1 the process flow diagram of one embodiment in this invention

DETAILED DESCRIPTION OF SPECIFIC EMBODIMENTS

The basic process flow of this invention includes: collecting high-concentration wastewater with the adjustment pool and preliminarily adjusting quality and quantity of the wastewater; pumping the wastewater through two ejectors (designed for adding hydrochloric acid and ferrous sulfate) into the electrolytic oxidation and flocculation reactor. During pumping, hydrochloric acid and ferrous sulfate are automatically added into the wastewater by the ejectors to keep the HP at 6-8 in order to ensure the reaction condition for the fast ionization of high-voltage plasma. Then, the wastewater is led to high-frequency electrolytic oxidation area wherein the catalyzed electrolytic oxidation takes place. Keeping the wastewater retaining to at high-frequency electrolytic oxidation area for 0.5-1 hour, and under the joint function of both liquid and solid surface catalysts, the wastewater therefore undergoes a complete oxidation process. The wastewater thereafter is channeled to the ultramicro bubble oxidation area for another oxidation process. The wastewater is retained in this area for 0.5-1 hour.

After the ultramicro bubble oxidation, the wastewater flows down to the coagulation pool wherein soda lime, ferrous sulfate and polyacrylamide are added into the wastewater; the whole reaction time lasts 10-30 time. Keeping agitating the wastewater during adding these ingredients. After precipitation of the flocculate, the supernatant is separated for further biochemical treatment. The sludge precipitated on the bottom of the pool will be mechanically dehydrated and disposed as solid waste. The liquid produced during dehydration will be rechanneled into the adjustment pool and subject to another round of electrolytic oxidation and flocculation processes.

In the following embodiments, the density configuration of all ingredients such as catalyst, coagulant, and decolorizer is calculated in accordance with weight percentage; that is to say, the quantity of ingredients is determined in relation to the weight of wastewater.

Embodiment 1

The A-O biochemical process was adopted to treat the coking wastewater in one iron and steel plant. The total retention time of this A-O system was 36 hours wherein A (anoxic) stage took 6 while O (oxic) stage 30 hours. The sludge recycle flow was 30% of wastewater inflow while air-water ratio in the aeration area was 30:1. All post-treatment pollution indices failed to satisfy Chinese highest discharge standard (the analysis of raw and treated water is shown in table 1).

When the electrolytic oxidation and flocculation reactor (treatment capacity: 1 ton/hour) of this invention was applied in combination with a A-O processing equipment (treatment capacity: 1 ton/hour), all post-treatment pollution indices met Chinese highest discharge standard. The specific process flow includes: pumping the wastewater through ejectors into the electrolytic oxidation and flocculation reactor. During pumping, 30% hydrochloric acid was automatically added into the wastewater and its amount was monitored by an inline PH meter, which kept the PH of the wastewater is staying stably at 7.0. 10% Ferrous sulfate was also automatically added into the wastewater in proportion to 0.05% of the wastewater (ferrous sulfate calculated in solid form). The wastewater was then successively treated in the pulsed high-voltage ionization area (working parameters: voltage 20 kv/cm, frequency 40 pps, time 1 s), the high-frequency electrolytic oxidation area (working parameters: pulse frequency 16000 Hz, current density at local area 1000 A/m$^2$, cathode-anode phase change time 1 min, wastewater retention time 0.5 h), the ultramicro bubble oxidation area (working parameters: turbulence pump's air pressure 0.3-0.6 MPa, amounting to 0.1-0.4:1 air-water volume ratio under normal temperature condition; and oxidation retention time 30 min) and lastly the coagulation area (under monitoring of inline HP meter, adding alkali till the PH of wastewater reached 8; adding 0.2% polyacrylamide in proportion to 0.005% of the wastewater (polyacrylamide calculated in solid form); the retention time 5 min). The wastewater after being so treated flowed down to the precipitation pool, where it experienced 3 hours' precipitation. The supernatant then was separated for further A-O biochemical processing. The total retention time was 36 hours wherein A stage took 6 hours while O stage 30 hours. The sludge recycle flow was 30% of wastewater inflow while air-water ratio was 30:1 (the analysis of raw and treated water is shown in table 1).

TABLE 1 treatment effect shown in Embodiment 1

| pollution indices | raw wastewater | treated by single A-O process | treated by this invention | jointly treated by this invention + A-O process | removal rate of this invention (%) |
|---|---|---|---|---|---|
| COD (mg/L) | 5500 | 400 | 2200 | 83 | 60 |
| BOD$_5$ (mg/L) | 700 | 35 | 880 | 15 | — |
| NH$_3$—N (mg/L) | 500 | 50 | 50 | 15 | 90 |
| chromaticity (times) | 800 | 200 | 40 | 40 | 95 |
| volatile phenols (mg/L) | 560 | 45 | 5.6 | 1 | 99 |
| cyanides | 80 | 60 | 8 | 0.3 | 90 |
| pH | 9.5 | 6-8 | 8-9 | 6-9 | — |

Embodiment 2

The A-O biochemical process was adopted to treat the coking wastewater in one iron and steel plant. The total retention time of this A-O system was 36 hours wherein A (anoxic) stage took 6 while O (oxic) stage 30 hours. The sludge recycle flow was 30% of wastewater inflow (volume ratio) while air-water ratio in the aeration area was 30:1 (volume ratio). All post-treatment pollution indices failed to satisfy Chinese highest discharge standard (the analysis of raw and treated water is shown in table 2).

When the electrolytic oxidation and flocculation reactor (treatment capacity: 1 ton/hour) of this invention was applied in combination with an A-O processing equipment (treatment capacity: 1 ton/hour), all post-treatment pollution indices met Chinese highest discharge standard. The specific process flow includes: pumping the wastewater through ejectors into the electrolytic oxidation and flocculation reactor. During pumping, 30% hydrochloric acid was automatically added into the wastewater and its amount was monitored by an inline PH meter, which kept the PH of the wastewater staying stably at 6.0. 10% Ferrous sulfate was also automatically added into the wastewater in proportion to 0.1% of the wastewater (ferrous sulfate to calculated in solid form). The wastewater was then successively treated in the pulsed high-voltage ionization area (working parameters: voltage 50 kv/cm, frequency 240 pps, time 180 s), the high-frequency electrolytic oxidation area (working parameters: pulse frequency 0.8 MHz, current density at local area 1000 A/m$^2$, cathode-anode phase change time 120 min, wastewater retention time 1.0 h), the ultramicro bubble oxidation area (wherein 10-30 μm ultramicro bubbles were created and working parameters: turbulence pump's air pressure 0.6 MPa, oxidation retention time 30 min) and lastly the coagulation area (under monitoring of inline HP meter, adding alkali till the PH of wastewater reached 9; adding 0.2% polyacrylamide in proportion to 0.02% of the wastewater (polyacrylamide calculated in solid form); the retention time 10 min). The wastewater after being so treated flowed down to the precipitation pool, where it experienced 4 hours' precipitation. The supernatant then was separated for further A-O biochemical processing. The total retention time was 36 hours wherein A stage took 6 hours while O stage 30 hours. The air-water ratio was 30:1 (the analysis of raw and treated water is shown in table 2).

Embodiment 3

The A-O biochemical process was adopted to treat the coking wastewater in one iron and steel plant. The total retention time of this A-O system was 36 hours wherein A (anoxic) stage took 6 while O (oxic) stage 30 hours. The sludge recycle flow was 30% of wastewater inflow (volume ratio) while air-water ratio in the aeration area was 30:1 (volume ratio). All post-treatment to pollution indices failed to satisfy Chinese highest discharge standard (the analysis of raw and treated water is shown in table 3).

When the electrolytic oxidation and flocculation reactor (treatment capacity: 1 ton/hour) of this invention was applied in combination with an A-O processing equipment (treatment capacity: 1 ton/hour), all post-treatment pollution indices met Chinese highest discharge standard. The specific process flow includes: pumping the wastewater through ejectors into the electrolytic oxidation and flocculation reactor. During pumping, 30% hydrochloric acid was automatically added into the wastewater and its amount was monitored by an inline PH meter, which kept the PH of the wastewater staying stably at 8.0. 10% Ferrous sulfate was also automatically added into the wastewater in proportion to 0.2% of the wastewater (ferrous sulfate to calculated in solid form). The wastewater was then successively treated in the pulsed high-voltage ionization area (working parameters: voltage 30 kv/cm, frequency 120 pps, time 100 s), the high-frequency electrolytic oxidation area (working parameters: pulse frequency 12 MHz, current density at local area 200 A/m$^2$, cathode-anode phase change time 120 min, wastewater retention time 1.0 h), the ultramicro bubble oxidation area (wherein 10-30 μm ultramicro bubbles were created and working parameters: turbulence pump's air pressure 0.6 MPa, oxidation retention time 30 min) and lastly the coagulation area (under monitoring of inline HP meter, adding alkali till the PH of wastewater reached 9; adding 0.2% polyacrylamide in proportion to 1.0% of the wastewater (polyacrylamide calculated in solid form); the retention time 10 min). The wastewater after being so treated flowed down to the precipitation pool, where it experienced 4 hours' precipitation. The supernatant then was separated for further A-O biochemical processing. The total retention time was 36 hours and the air-water ratio was 30:1 (the analysis of raw and treated water is shown in table 3).

TABLE 2 treatment effect shown in Embodiment 2

| pollution indices | raw wastewater | treated by single A-O process | treated by this invention | jointly treated by this invention + A-O process | removal rate of this invention (%) |
|---|---|---|---|---|---|
| COD (mg/L) | 5800 | 501 | 1740 | 94 | 70 |
| BOD$_5$ (mg/L) | 700 | 38 | 696 | 18 | — |
| NH$_3$—N (mg/L) | 600 | 55 | 48 | 13 | 92 |
| chromaticity (times) | 800 | 200 | 48 | 16 | 97 |
| volatile phenols (mg/L) | 660 | 76 | 6.6 | 0.8 | 99 |
| cyanides | 102 | 64 | 10.2 | 0.3 | 90 |
| pH | 9.5 | 6-8 | 9.0 | 6.0 | — |

TABLE 3 treatment effect shown in Embodiment 3

| pollution indices | raw wastewater | treated by single A-O process | treated by this invention | jointly treated by this invention + A-O process | removal rate of this invention (%) |
|---|---|---|---|---|---|
| COD (mg/L) | 5200.0 | 385.0 | 1976.0 | 82.0 | 62 |
| $BOD_5$ (mg/L) | 1012.0 | 29.0 | 830.0 | 16.0 | — |
| $NH_3$—N (mg/L) | 467.0 | 43.0 | 51.4 | 12.0 | 89 |
| chromaticity (times) | 800.0 | 200.0 | 64.0 | 16.0 | 92 |
| volatile pheonls (mg/L) | 590.0 | 76.0 | 5.9 | 0.8 | 99 |
| cyanides | 76.0 | 64.0 | 6.1 | 0.3 | 92 |
| pH | 9.5 | 6-9 | 9.0 | 6-9 | — |

Embodiment 4

The A-O biochemical process was adopted to treat the coking wastewater in one iron and steel plant. The total retention time of this A-O system was 36 hours wherein A (anoxic) stage took 6 while O (oxic) stage 30 hours. The sludge recycle flow was 30% of wastewater inflow (volume ratio) while air-water ratio in the aeration area was 30:1 (volume ratio). All post-treatment pollution indices failed to satisfy Chinese highest discharge standard (the to analysis of raw and treated water is shown in table 4).

When the electrolytic oxidation and flocculation reactor (treatment capacity: 20 ton/hour) of this invention was applied in combination with an A-O processing equipment (treatment capacity: 20 ton/hour), all post-treatment pollution indices met Chinese highest discharge standard. The specific process flow includes: pumping the wastewater through ejectors into the electrolytic oxidation and flocculation reactor. During pumping, 30% hydrochloric acid was automatically added into the wastewater and its amount was monitored by an inline PH meter, which kept the PH of the wastewater staying stably at 6.5. 10% Ferrous sulfate was also automatically added into the wastewater in proportion to 0.1% of the wastewater (ferrous sulfate calculated in solid form). The wastewater was then successively treated in the to pulsed high-voltage ionization area (working parameters: voltage 30 kv/cm, frequency 120 pps, time 60 s), the high-frequency electrolytic oxidation area (working parameters: pulse frequency 8000 Hz, current density at local area 500 A/m$^2$, cathode-anode phase change time 10 min, wastewater retention time 0.5 h), the ultramicro bubble oxidation area (wherein 10-30 μm ultramicro bubbles were created and working parameters: turbulence pump's air pressure 0.5 MPa, oxidation retention time 40 min) and lastly the coagulation area (under monitoring of inline HP meter, adding alkali till the PH of wastewater reached 9; adding 0.2% polyacrylamide in proportion to 0.01% of the wastewater (polyacrylamide calculated in solid form); the retention time 12 min). The wastewater after being so treated flowed down to the precipitation pool, where it experienced 4 hours' precipitation. The supernatant then was separated for further A-O biochemical processing. The total retention time was 36 hours and the air-water ratio was 30:1 (the analysis of raw and treated water is shown in table 4)

TABLE 1 treatment effect shown in Embodiment 4

| pollution indices | raw wastewater | treated by single A-O process | treated by this invention | jointly treated by this invention + A-O process | removal rate of this invention (%) |
|---|---|---|---|---|---|
| COD (mg/L) | 5150.0 | 385.0 | 2317.5 | 78.0 | 55 |
| $BOD_5$ (mg/L) | 989.0 | 29.0 | 951.0 | 20.0 | — |
| $NH_3$—N (mg/L) | 378.0 | 43.0 | 56.7 | 11.5 | 85 |
| chromaticity (times) | 800.0 | 200.0 | 80.0 | 16.0 | 90 |
| volatile phenols (mg/L) | 690.0 | 76.0 | 34.5 | 0.7 | 95 |
| Cyanides | 88.0 | 64.0 w | 7.0 | 0.3 | 92 |
| pH | 9.2 | 6.0-8.0 | 9.0 | 6.0-8.0 | — |

Embodiment 5

When the electrolytic oxidation and flocculation reactor (treatment capacity: 1 ton/hour) of this invention was applied in combination with an A-O processing equipment (treatment capacity: 1 ton/hour), all post-treatment pollution indices met Chinese highest discharge standard. The specific process flow includes: pumping the wastewater through ejectors into the electrolytic oxidation and flocculation reactor. During pumping, 30% hydrochloric acid was automatically added into the wastewater and its amount was monitored by an inline PH meter, which kept the PH of the wastewater staying stably at 6.5. 10% Ferrous sulfate was also automatically added into the wastewater in proportion to 0.15% of the wastewater (ferrous sulfate calculated in solid form). The wastewater was then successively treated in the pulsed high-voltage ionization area (working parameters: voltage 40 kv/cm, frequency 200 pps, time 120 s), the high-frequency electrolytic oxidation area (working parameters: pulse frequency 1 MHz, current density at local area 1000 A/m$^2$, cathode-anode phase change time 1 min, wastewater retention time 0.6 h), the ultramicro bubble oxidation area (wherein 10-30 μm ultramicro bubbles were created and working parameters: turbulence pump's air pressure 0.3 MPa, amounting to 0.2:1 air-water volume ratio under normal temperature to condition; oxidation retention time 50 min) and lastly the coagulation area (under monitoring of inline HP meter, adding alkali till the PH of wastewater reaches 8.0; adding 0.2% polyacrylamide in proportion to 0.01% of the wastewater (polyacrylamide calculated in solid form); the retention time 15 min). The wastewater after being so treated flowed down to the precipitation pool, is where it experienced 5 hours' precipitation. The supernatant then was separated for further A-O biochemical processing. The total retention time was 36 hours wherein A stage took 6 hours while O stage 30 hours. The sludge recycle flow was 30% of wastewater inflow while air-water ratio was 30:1.

The invention claimed is:

1. A method of integrating electrochemical oxidation and flocculation processes for pre-treatment of coking wastewater, comprises steps as follow:
    (1) Leading high-concentration coking wastewater into a reaction pool; adding acidic solution into the wastewater to adjust its pH to 6-8, then adding ferrous sulfate as a catalyst;
    (2) Leading wastewater treated by Step (1) through parallel plate electrodes wherein the wastewater is treated by pulsed high-voltage electric field with the following working parameters: leading-edge rise time of 40-50 ns, pulse breadth of 50-300 ns, electric field strength of 20-50 kv/cm, repetition frequency of 40-240 pps, and acting time of 1-180 s;
    (3) Leading wastewater treated by Step (2) through another set of parallel plate electrodes wherein the wastewater is treated by pulsed high-frequency DC electrolysis with the following working parameters: pulse frequency 0.8 MHz-20 MHz, current density at electrolytic oxidation area of 200-1000 A/m$^2$, cathode-anode phase change time of 1-120 minutes, and electrolytic area retention time of 0.5-1 hour;
    (4) Further treatment of the wastewater after Step (3) with microbubble oxidation process wherein alkali is added into wastewater to adjust the pH to 8-9; then polyacrylamide is added into wastewater as a coagulant aid; keeping wastewater at this reaction area for 5-20 minutes and then leaving the wastewater for natural precipitation for 4-6 hours; wastewater so treated is eligible for later routine biochemical treatment.

2. The method of integrating electrochemical oxidation and flocculation processes for pre-treatment of coking wastewater as described in claim 1, wherein the catalyst ferrous sulfate in Step (1) is made up of 10% solution before it being added into the wastewater; the required amount of ferrous sulfate, calculated in its solid form, is 0.05-0.2% of the total weight of coking wastewater.

3. The method of integrating electrochemical oxidation and flocculation processes for pre-treatment of coking wastewater as described in claim 1, wherein the plate electrodes used in Step (3) are DSA electrodes, which take ceramics as their base material, out of which exists a coating of lead dioxide acting as catalyst.

4. The method of integrating electrochemical oxidation and flocculation processes for pre-treatment of coking wastewater as described in claim 1, wherein the coagulant aid polyacrylamide is made up of 0.2% solution by weight before it being added into the wastewater, the required amount of polyacrylamide, calculated in its solid form, is 0.005-0.02% of the total weight of coking wastewater.

5. The method of integrating electrochemical oxidation and flocculation processes for pre-treatment of coking wastewater as described in claim 1, wherein the microbubble oxidation process in Step (4) adopts ultramicro aeration apparatus and air-dissolving system, which are able to generate ultramicro bubbles smaller than 30 μm in diameter; the major working parameter of the turbulence pump used in Step (4) is air pressure 0.3-0.6 MPa, amounting to 0.1-0.4:1 air-water volume ratio under normal temperature; the retention time of the wastewater in microbubble oxidation process area is 0.5-1 hour.

* * * * *